United States Patent
Molnar

(10) Patent No.: US 7,252,249 B2
(45) Date of Patent: Aug. 7, 2007

(54) SOLENOID-TYPE FUEL INJECTOR ASSEMBLY HAVING STABILIZED FERRITIC STAINLESS STEEL COMPONENTS

(75) Inventor: James R. Molnar, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 885 days.

(21) Appl. No.: 10/080,474

(22) Filed: Feb. 22, 2002

(65) Prior Publication Data

US 2003/0160116 A1    Aug. 28, 2003

(51) Int. Cl.
F02M 51/00    (2006.01)
(52) U.S. Cl. .............. 239/585.4; 239/584; 239/585.1; 239/600; 239/DIG. 19; 148/325
(58) Field of Classification Search ...............
239/533.2–533.12, 585.1–585.5, 584, DIG. 19, 239/600; 219/121.64; 29/890.142, 888.4; 420/41, 42, 68–70; 148/325, 326, 327
See application file for complete search history.

(56) References Cited

U.S. PATENT DOCUMENTS

| | | | | |
|---|---|---|---|---|
| 4,239,556 A | * | 12/1980 | Cline et al. ............... | 148/327 |
| 4,705,581 A | * | 11/1987 | Honkura et al. ............... | 420/70 |
| 4,763,876 A | * | 8/1988 | Oda et al. ............... | 251/359 |
| 5,091,024 A | * | 2/1992 | DeBold et al. ............ | 148/306 |
| 5,296,677 A | * | 3/1994 | Takahashi et al. ..... | 219/146.41 |
| 5,601,664 A | * | 2/1997 | Kosa et al. ............... | 148/325 |
| 5,628,449 A | | 5/1997 | Onuma et al. | |
| 6,048,413 A | * | 4/2000 | Park et al. ............... | 420/68 |
| 6,105,884 A | | 8/2000 | Molnar et al. | |
| 6,123,275 A | | 9/2000 | Geiger et al. | |
| 6,186,421 B1 | | 2/2001 | Wahba et al. | |
| 6,189,817 B1 | | 2/2001 | Lambert | |
| 6,244,526 B1 | * | 6/2001 | Schuldt et al. ............ | 239/585.1 |
| 6,260,537 B1 | | 7/2001 | Lamb et al. | |
| 6,264,112 B1 | | 7/2001 | Landschoot et al. | |
| 6,276,339 B1 | | 8/2001 | Shebert, Jr. et al. | |
| 6,279,840 B1 | | 8/2001 | Buckley | |
| 6,318,641 B1 | | 11/2001 | Knebel et al. | |
| 6,328,232 B1 | | 12/2001 | Haltiner, Jr. et al. | |
| 6,336,595 B1 | | 1/2002 | Barbier | |
| 6,338,445 B1 | | 1/2002 | Lambert et al. | |
| 6,340,017 B1 | | 1/2002 | Dick | |
| 6,340,121 B1 | | 1/2002 | Lambert | |
| 6,345,606 B1 | | 2/2002 | Ricci-Ottati et al. | |
| 6,363,917 B1 | | 4/2002 | Hopley | |
| 6,364,222 B1 | | 4/2002 | Haltiner, Jr. et al. | |
| 6,373,363 B1 | | 4/2002 | Spakowski et al. | |
| 6,378,503 B1 | | 4/2002 | Lambert | |

(Continued)

Primary Examiner—Steven J. Ganey
(74) Attorney, Agent, or Firm—Paul L. Marshall

(57) ABSTRACT

A solenoid-type fuel injector assembly having at least one component formed of stabilized, solenoid-quality ferritic stainless steel. In a preferred embodiment, an austenitic fuel tube is laser-welded to an injector body and to a solenoid pole piece formed of the subject material. The stabilized, solenoid-quality ferritic stainless steel, preferably a free-machining grade thereof, comprises from about 10% to about 35% chromium, and at least one stabilizing element selected from the group consisting of titanium and columbium. Components thus formed are weldable, exhibit soft magnetic properties sufficiently strong for carrying a magnetic flux in a solenoid pole piece, have desired structural and mechanical properties, and reduce the susceptibility of a solenoid-type fuel injector to metallurgical sensitization and intergranular corrosive attack at weld sites.

6 Claims, 1 Drawing Sheet

U.S. PATENT DOCUMENTS

| | | |
|---|---|---|
| 6,390,067 B1 | 5/2002 | Haltiner, Jr. et al. |
| 6,390,385 B1 | 5/2002 | Hardy et al. |
| 6,405,940 B2 | 6/2002 | Harcombe et al. |
| 6,408,801 B1 | 6/2002 | Frostick et al. |
| 6,409,102 B1 * | 6/2002 | Luttrell et al. ............ 239/585.4 |
| 6,412,712 B1 | 7/2002 | Buckley |
| 6,420,817 B1 | 7/2002 | Ricci-Ottati et al. |
| 6,421,913 B1 | 7/2002 | Bonnah, II et al. |
| 6,422,199 B1 | 7/2002 | Buckley et al. |
| 6,422,210 B1 | 7/2002 | Lambert et al. |
| 6,425,368 B1 | 7/2002 | Lambert |
| 6,431,469 B2 | 8/2002 | Lambert et al. |
| 6,434,822 B1 | 8/2002 | Perry et al. |
| 6,454,191 B1 | 9/2002 | Spakowski et al. |
| 6,454,192 B2 | 9/2002 | Perry |
| 6,464,153 B1 | 10/2002 | Bonnah, II et al. |
| 6,467,702 B1 | 10/2002 | Lambert et al. |
| 6,471,142 B1 | 10/2002 | Lambert |
| 6,481,641 B1 | 11/2002 | Mieney |
| 6,502,555 B1 | 1/2003 | Harcombe et al. |
| 6,508,416 B1 | 1/2003 | Mastro et al. |
| 6,511,004 B2 | 1/2003 | Landschoot et al. |
| 6,513,733 B1 | 2/2003 | Lambert |
| 6,520,154 B2 | 2/2003 | Lamb et al. |
| 6,588,102 B1 | 7/2003 | Perry et al. |
| 6,601,784 B2 | 8/2003 | Muller-Girard, Jr. et al. |
| 6,612,508 B2 | 9/2003 | Lambert |
| 6,616,070 B1 | 9/2003 | Kunkulagunta |
| 6,629,650 B2 | 10/2003 | Curran et al. |

* cited by examiner

SOLENOID-TYPE FUEL INJECTOR ASSEMBLY HAVING STABILIZED FERRITIC STAINLESS STEEL COMPONENTS

TECHNICAL FIELD

The present invention relates to solenoid-type fuel injectors; more particularly, to such fuel injectors having ferritic stainless steel components; and most particularly, to such fuel injectors wherein at least one of the components is formed of a solenoid-quality stabilized ferritic stainless steel.

BACKGROUND OF THE INVENTION

Solenoid-type fuel injectors typically are assembled by welding together non-stabilized ferritic stainless steel components, such as a metal tubular injection body welded to a metal fuel tube. Such welding may be carried out by various techniques, including microplasma welding, but typically employs a laser with a continuous laser beam to melt and fuse the components at the bonding surfaces, forming multiple laser weld sites. A slipover injection molded plastic sleeve typically is employed to cover the weld sites; however, this can enhance corrosion at the covered weld sites by fostering an oxygen depletion condition.

The process of laser welding two metal components together heats a zone at and below the touching surfaces to create a pool of molten metal within both members that, upon solidification, forms the weld nugget that joins the two metallic components. Because of the high temperatures inherent in any laser welding process, non-stabilized ferritic stainless steel components and the like used in the production of solenoid-type fuel injectors can incur a deleterious metallurgical effect known as sensitization.

Metallurgical sensitization is characterized by intergranular corrosive precipitates, for example, chromium carbides, that render the weld site and surrounding metallic area susceptible to intergranular attack and corrosion. Non-stabilized ferritic stainless steel grades typically used in conventional solenoid-type fuel injectors incur metal sensitization upon being welded, and are thus rendered susceptible to intergranular corrosive attack. The sensitized weld sites are vulnerable to corrosion that can lead to failure of the fuel injector. Because of this susceptibility, weld sites in conventional prior art solenoid-type fuel injectors typically are hermetically sealed, an expensive and time consuming process, to prevent them from contacting detrimental corrosive environments such as those typically experienced under the hood of automotive vehicles.

Further, non-stabilized ferritic stainless steels used in prior art fuel injectors typically are not formulated for easy, or "free," machining. Components therefore are formed typically by stamping, or by machining only with great difficulty and expense.

Therefore, there is a strong need for an improved solenoid-type fuel injector assembly comprising components that are easily weldable, can be easily formed by machining, are stabilized against metallurgical sensitization and corrosive attack, exhibit soft magnetic properties capable of carrying a magnetic flux, and are able to withstand harsh corrosive environments.

It is a principal object of this invention to provide a solenoid-type fuel injector assembly having components which are laser weldable and are also capable of withstanding harsh corrosive environments.

It is a further object of this invention to provide a solenoid-type fuel injector assembly comprising stainless steel components that are readily formed by machining.

It is a still further object of this invention to provide a solenoid-type fuel injector assembly having reduced susceptibility to metallurgical sensitization and intergranular corrosive attacks at laser weld sites joining the components.

It is a still further additional object of this invention to provide a solenoid-type fuel injector assembly having ferritic stainless steel polepieces that exhibit soft magnetic properties and are thus capable of carrying a temporary magnetic flux.

The inventor has developed an improved solenoid-type fuel injector assembly capable of solving the aforementioned problems by the incorporation of components formed from or welded to stabilized ferritic stainless steel, preferably a solenoid-quality and preferably a "free machining" (FM) grade of stabilized ferritic stainless steel, which may be laser-welded.

SUMMARY OF THE INVENTION

Briefly described, the present invention is directed to a solenoid-type fuel injector assembly having at least one component formed of stabilized, solenoid quality ferritic stainless steel. In a preferred embodiment, an austenitic fuel tube is laser-welded to an injector body formed of the subject material, preferably a free-machining formulation thereof, comprising from about 10% to about 35% chromium, and at least one stabilizing element selected from the group consisting of titanium and columbium. Preferably, the solenoid polepiece is formed of such material having about 12% chromium, although higher chromium-content materials may be used as desired, within the scope of the invention. Components thus formed are weldable, exhibit soft magnetic properties sufficiently strong for carrying a magnetic flux in a solenoid frame or polepiece, have desired structural and mechanical properties, and reduce the susceptibility of a solenoid-type fuel injector to metallurgical sensitization and intergranular corrosive attack at laser weld sites.

The present invention is also directed to a method for reducing the susceptibility of solenoid-type injectors to metallurgical sensitization and intergranular corrosive attacks at weld sites and the region surrounding the weld sites.

Additional objects of this invention are to provide improved elements and arrangements thereof for the purposes described which are inexpensive to manufacture, dependable, and fully effective in accomplishing the intended purposes.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DESCRIPTION OF THE PREFERRED EMBODIMENTS

Figure 1:
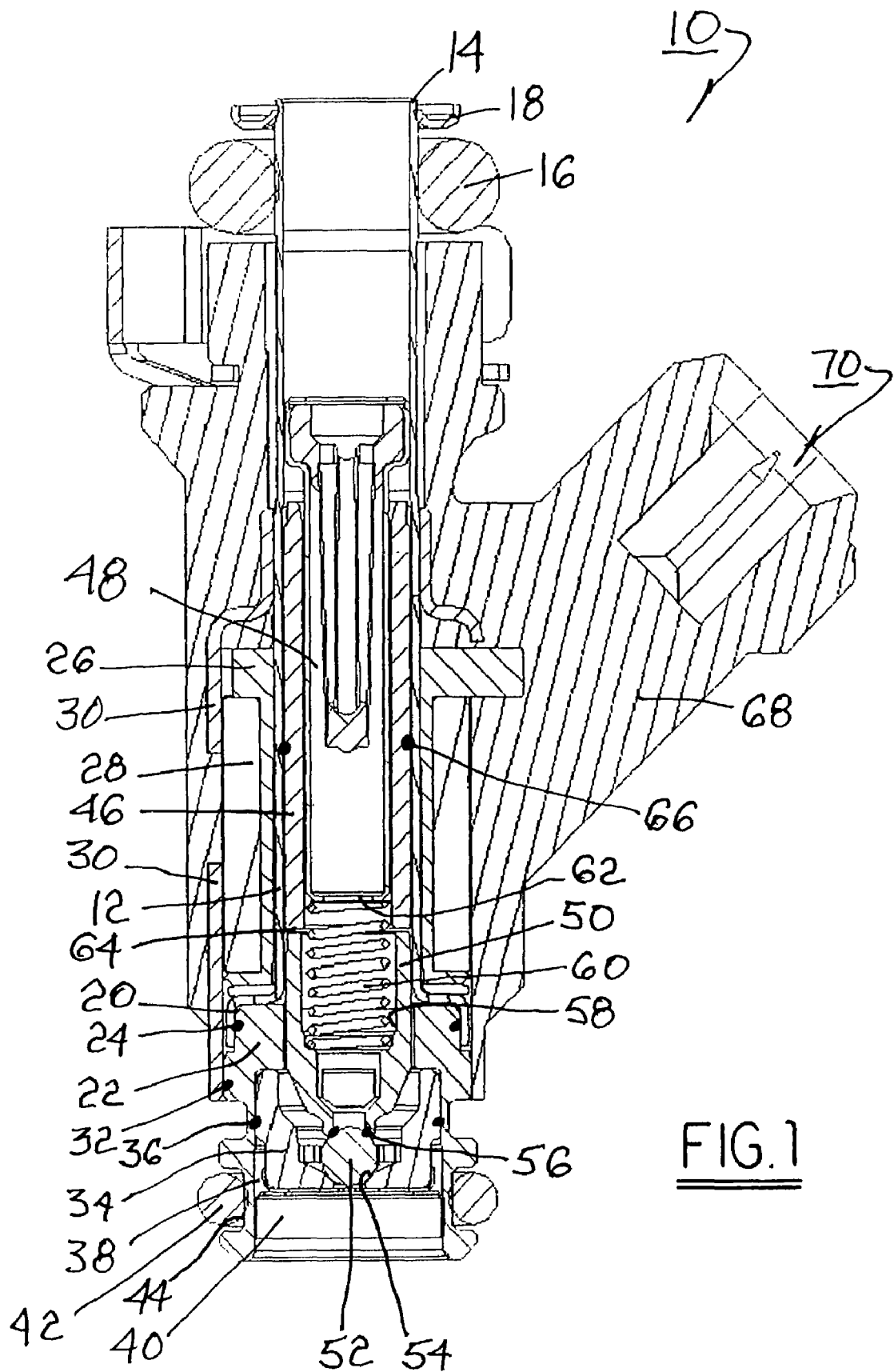
FIG. 1 is an elevational cross-sectional view of a solenoid-type fuel injector in accordance with the invention.

A solenoid-type fuel injector assembly 10 in accordance with the invention, as depicted in FIG. 1, includes at least one component formed of stabilized ferritic stainless steel, preferably of solenoid quality, comprising a fuel-tube laser welded to an injector body and to a solenoid pole piece. Such solenoids are suited for use in internal combustion engines of automotive vehicles and the like, and can also be used in a variety of other fuel systems such as in marine and aircraft applications.

The stabilized ferritic stainless steel components used in the solenoid-type fuel injectors of the invention contain chromium (Cr) which may be present in a low amount, from about 10% to about 15%; a medium amount, greater than about 15% but less than about 20%; or a high amount, greater than about 20% but less than about 35%. Preferably, the stabilized ferritic stainless steel comprises about 12% to about 25% chromium, and more preferably, about 12% to about 19% chromium, expressed in terms of weight percentage. The phrase "stabilized ferritic stainless steel" means a ferritic stainless steel comprising at least one stabilizing element of titanium (Ti) and/or niobium (Nb) (also known as columbium (Cb)), in an amount up to about 1.5% (expressed in terms of weight percentage) of each or both element(s). As is believed in the metallurgical arts, the stabilizing elements prevent high temperature metallurgical embrittlement and sensitization at a weld site by scavenging low or trace amounts of carbon in the stainless steel which otherwise would be combined with chromium as chrome carbide at grain boundaries. Once a weld site is sensitized, the weld site and the region surrounding the weld sites are rendered more susceptible to intergranular corrosive attack and overall mechanical weakness from depletion of chromium in the grains.

Weld sites formed in overlapping bonding regions of stabilized ferritic stainless steel components provide sufficient stabilization upon solidification of the weld to prevent sensitization. Therefore, the incorporation of stabilized ferritic stainless steel components in solenoid-type fuel injectors reduces susceptibility to sensitization, thereby maintaining a degree of immunity from environmental degradation and corrosive intergranular attacks that would weaken the injector and lead to its overall failure.

Stabilized ferritic stainless steel used to form fuel injector components in accordance with the invention is preferably of solenoid quality; that is, the stainless steel has soft magnetic property of sufficient intensity that it is suitable for use in the pole pieces or frames of electric solenoid actuators of fuel injectors. Examples of commercially available stabilized ferritic stainless steel material suitable for use in the solenoid-type fuel injectors of the present invention, include, but are not limited to, Armco 18 Cr-Cb and Armco 439 Stainless Steel (formerly Armco Inc., of Butler, Pa., now AK Steel Corporation of Middletown, Ohio), and Allegheny Ludlum Stainless Steel Type 439, also known as ASTM XM-8, having the UNS designation S43035 (Allegheny Ludlum Corp., of Pittsburgh, Pa.).

Stabilized ferritic stainless steel for use in forming some components in accordance with the invention is also preferably of free machining grade, as is known in the metallurgical arts; that is, it has inclusions of, for example, sulfur and manganese which greatly enhance the machinability of the material by providing chip-breaking capability. Thus, the most preferred material for those components is solenoid quality (SQ), free machining (FM), stabilized ferritic stainless steel.

A preferred method of reducing susceptibility to metallurgical sensitization in solenoid-type fuel injectors includes the steps of arranging a plurality of components for welding so that corresponding bonding surfaces overlap, at least one of the components in each pair to be welded being formed of stabilized ferritic stainless steel, and laser welding the components at the adjacent overlapping bonding surfaces to form laser weld sites between the adjacent overlapping surfaces, thereby joining the components at the overlapping surfaces. The resulting solenoid-type fuel injectors are resistant to metallurgical sensitization and intergranular corrosive attack in the laser weld sites and the surrounding regions in the adjacent overlapping bonding surfaces.

Referring to FIG. 1, a solenoid-actuated fuel injector 10 in accordance with the invention includes a generally cylindrical fuel tube 12 provided near a fuel-entry end 14 with an upper seal ring 16 and seal ring retainer 18 for sealably connecting injector 10 to a conventional fuel rail of a fuel-injected internal combustion engine (not shown) or other source of fuel. Fuel tube 12 is flared at its opposite end 20 to receive therein an injector body 22 which preferably is welded as by laser welding to flared end 20 in a continuous weld line 24 extending around injector body 22. Surrounding fuel tube 12 is a bobbin 26 supporting a coil 28 of a solenoid. Coil 28 is further surrounded by coil body 30 which is spot welded to injector body 22 at a plurality of radial locations 32. An injector seat assembly 34 is disposed within and welded to injector body 22 in a continuous weld line 36 extending around injector body 22. A generally cylindrical director 38 and director retainer 40 are pressed into injector body 22 adjacent seat assembly 34. A lower seal ring 42 for sealing the injector into an engine manifold (not shown) is disposed in an annular groove 44 on the outer surface of injector body 22.

A generally cylindrical pole piece 46 is disposed coaxially within fuel tube 12, and a calibration tube/filter assembly 48 is disposed coaxially within polepiece 46. Between pole piece 46 and seat assembly 34 is disposed a valve assembly 50 including a ball valve head 52 for mating with seat 54 in seat assembly 34. Preferably, ball head 52 is welded into valve assembly 50 by a continuous weld line 56 extending around ball head 52.

Valve assembly 50 is provided with a well 58 for receiving a compression return spring 60. Spring 60 is compressed between the bottom of well 58 and the anterior end 62 of assembly 48. The axial location of assembly 48 governs the degree of compression of spring 60. Further, during assembly of the fuel injector, pole piece 46 is axially positioned within fuel tube 12 such that a gap 64 is formed between pole piece 46 and valve assembly 50. This gap, preferably about 100 micrometers in width, defines the stroke of the valve between its open and closed positions, as the pole piece acts as a stop for valve-opening motion of the valve assembly. After the proper gap 64 is established, pole piece 46 is spot welded to fuel tube 12 at a plurality of radial locations 66.

Preferably, the fuel tube and injector mechanism is clad in a polymeric shroud 68 as by insertion molding. Shroud 68 provides support and location for an electrical connector 70.

Forming the fuel tube of stabilized ferritic stainless steel permits use of non-stabilized ferritic stainless steel in other components to be welded to the fuel tube without sensitization of the welds. However, in a currently preferred embodiment of fuel injector 10, the fuel tube 12 is formed of a 300 Series austenitic stainless steel and injector body 22 and pole piece 46 are formed of free machining solenoid quality stabilized ferritic stainless steel, preferably Chrome Core 18FM, or 12FM in the case of the pole piece, available from Carpenter Technologies, Reading, Pa., USA. Preferably, seat assembly 34 is formed of a martensitic stainless steel. Preferably, valve assembly 50, which is also the armature of the solenoid, is formed of Chrome Core 12FM stainless steel. Preferably, coil body 30 is formed of a stabilized ferritic stainless steel strip stock having good soft magnetic properties, such as SS-439. Further, all welds are preferably formed by conventional laser welding as is well known in the welding art.

While the invention has been described with reference to preferred embodiments, it will be understood by those skilled in the art that various changes may be made and equivalents may be substituted for elements thereof without departing from the scope of the invention. For example, while the preferred embodiments are directed towards solenoid-type fuel injectors, it should be noted that the invention is equally applicable to stainless steel components in non-solenoid automotive fuel injectors, as well as to solenoid actuators generally. The shape, size and dimensions of the stainless steel components according to the present invention can vary widely, and are determined by the desired end product and end use of the article formed in accordance with the present invention.

In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention include all embodiments falling within the scope and spirit of the appended claims.

What is claimed is:

1. A fuel injector assembly comprising:
   a seat assembly formed of a martensitic steel;
   an injector body formed of solenoid-quality stabilized ferritic stainless steel; and
   a solenoid body formed of solenoid-quality stabilized ferritic stainless steel, wherein said injector body and said solenoid body are adjacent and are joined together by welding, wherein said stabilized ferritic stainless steel comprises, in terms of weight percentage, about 10% to about 35% chromium and at least one element selected from the group consisting of titanium and columbium, wherein each of said at least one element is present at no more than about 1.5 weight percent.

2. A fuel injector assembly in accordance with claim 1 wherein said stabilized ferritic stainless steel includes between 0.26 and 1.5 weight percent of titanium.

3. A fuel injector assembly in accordance with claim 1 wherein said stabilized ferritic stainless steel includes between 1.1 and 1.5 weight percent of columbium.

4. An electric solenoid comprising a plurality of components formed of solenoid-quality stabilized ferritic stainless steel, wherein said stabilized ferritic stainless steel includes, in terms of weight percentage, between 31% and 35% weight percent of chromium and at least one element selected from the group consisting of titanium and columbium, and wherein each of said at least one element is present at no more than about 1.5 weight percent.

5. A fuel injector assembly comprising a plurality of components formed of solenoid-quality stabilized ferritic stainless steel and a seat assembly formed of a martensitic stainless steel, wherein at least two of said plurality of components are adjacent and are joined together by welding, wherein said stabilized ferritic stainless steel comprises, in terms of weight percentage, 21% to about 35% chromium and at least one element selected from the group consisting of titanium and columbium, and wherein each of said at least one element is present at no more than about 1.5 weight percent, wherein said plurality of components includes an body and a solenoid body.

6. A fuel injector assembly comprising a plurality of components, wherein at least one of said plurality of components is formed of solenoid-quality stabilized ferritic stainless steel, wherein said stabilized ferritic stainless includes, in terms of weight percentage, about 10% to about 35% chromium and between 1.1 and 1.5 weight percent of columbium.

* * * * *